(12) United States Patent
Lymberopoulos et al.

(10) Patent No.: US 8,966,616 B2
(45) Date of Patent: Feb. 24, 2015

(54) LEVERAGING BIOMETRICS FOR AUTHENTICATION AND TOUCH DIFFERENTIATION

(71) Applicant: Microsoft Corporation, Redmond, WA (US)

(72) Inventors: Dimitrios Lymberopoulos, Bellevue, WA (US); Oriana Riva, Redmond, WA (US); Gerald DeJean, Redmond, WA (US); Jie Liu, Medina, WA (US); Nissanka Arachchige Bodhi Priyantha, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 136 days.

(21) Appl. No.: 13/854,386

(22) Filed: Apr. 1, 2013

(65) Prior Publication Data

US 2014/0298450 A1    Oct. 2, 2014

(51) Int. Cl.
*G06F 7/04* (2006.01)
*G06F 21/32* (2013.01)

(52) U.S. Cl.
CPC ..................................... *G06F 21/32* (2013.01)
USPC ............................................ 726/19; 713/186

(58) Field of Classification Search
USPC ............................................ 726/19; 713/186
See application file for complete search history.

(56) References Cited

U.S. PATENT DOCUMENTS

| | | | |
|---|---|---|---|
| 6,898,299 B1 | 5/2005 | Brooks | |
| 7,948,361 B2 | 5/2011 | Bennett et al. | |
| 8,494,228 B2 * | 7/2013 | Fujii et al. | 382/115 |
| 8,542,095 B2 * | 9/2013 | Kamei | 340/5.82 |
| 8,588,478 B2 * | 11/2013 | Makimoto et al. | 382/116 |
| 2004/0123106 A1 | 6/2004 | D'Angelo | |
| 2008/0155666 A1 * | 6/2008 | Bloomberg et al. | 726/5 |
| 2008/0195870 A1 | 8/2008 | Posamentier | |
| 2010/0094157 A1 | 4/2010 | Kummer | |
| 2010/0134423 A1 | 6/2010 | Brisebois et al. | |
| 2010/0321159 A1 * | 12/2010 | Stewart | 340/5.83 |
| 2011/0141063 A1 | 6/2011 | Grundmann | |
| 2012/0218218 A1 | 8/2012 | Kauko | |

(Continued)

OTHER PUBLICATIONS

"International Search Report & Written Opinion for PCT Patent Application No. PCT/US2014/032294", Mailed Date: Aug. 5, 2014, Filed Date: Mar. 31, 2014, 12 Pages.

(Continued)

*Primary Examiner* — Kambiz Zand
*Assistant Examiner* — Amare Tabor
(74) *Attorney, Agent, or Firm* — Julie Kane Akater; Danielle Johnston Holmes; Micky Minhas

(57) ABSTRACT

Biometric authentication and touch differentiation embodiments are described which use a handheld mobile computing device having a signal injection site that injects a signal into a user's hand for a prescribed period of time, and at least one signal sensing site each of which captures a signal emanating from a finger of either of the user's hands that is touching the signal sensing site during at least the period of time the signal is injected. The captured signal or signals are analyzed to determine whether they match, to a prescribed degree, a pre-established signal model that is indicative of a signal or signals expected to be captured. The signal matching determination can be employed to authenticate a user, or identify which finger of a user's hand is touching the computing device.

20 Claims, 8 Drawing Sheets

(56) References Cited

U.S. PATENT DOCUMENTS

2012/0229400 A1    9/2012    Birnbaum et al.
2013/0176109 A1*   7/2013    Higuchi et al. .............. 340/5.83

OTHER PUBLICATIONS

Cornelius, C., Z. Marois, J. Sorber, R. Peterson, S. Mare, D. Kotz, Passive biometrics for pervasive wearable devices (Poster paper), Workshop on Mobile Computing Systems and Applications (HotMobile), Feb. 2012, p. 1.

Cornelius, C., J. Sorber, R. Peterson, J. Skinner, R. Haalter, D. Kotz, Who wears me? Bioimpedance as a passive biometric, Proc. of the 3rd USENIX Workshop on Health Security and Privacy, Aug. 2012, Bellevue, WA.

Fortune, S., Bioencrypted bracelets, http://prote.in/feed/2012/08/bioencrypted-bracelets, Aug. 2012, pp. 1-9.

Harrison, C., M. Sato, I. Poupyrev, Capacitive fingerprinting: Exploring user differentiation by sensing electrical properties of the human body, ACM Symposium on User Interface Software and Technology, UIST 2012, Oct. 7-10, 2012, pp. 537-544, Cambridge Mass, USA.

* cited by examiner

LEVERAGING BIOMETRICS FOR AUTHENTICATION AND TOUCH DIFFERENTIATION

BACKGROUND

The computing power and functionality of mobile computing devices continues to increase rapidly. Various types of mobile computing devices are now commercially available which allow users to affordably and conveniently perform full-fledged computing and data communication activities while they are on the move. Today's mobile computing devices commonly integrate a wide variety of functionality including a plurality of different wireless data communication capabilities, a touch-sensitive display screen, one or more microphones, and one or more video cameras. Smartphones and tablet computers are two popular examples of such mobile computing devices. The number and types of mobile computing applications that are available to mobile computing device users are also continuing to increase rapidly, as is the number of people that regularly use a mobile computing device to perform their online computing and information management tasks. In fact, mobile computing devices have become a principle computing device for many people.

Authentication of the identity of a user of a mobile computing device is important to prevent an unauthorized person from masquerading as an authorized user. This type of identity theft can have devastating results such as loss of secure information, theft of products or services, and so on. Current authentication schemes for ensuring the authenticity of a user typically require a password from the user at the start of each session or after a period of inactivity. Some schemes wait a fixed amount of time before requiring re-authentication, which typically entails the user re-entering a password after this fixed amount of time elapses.

SUMMARY

Biometric authentication and touch differentiation embodiments described herein generally involve the use of a handheld mobile computing device that includes a signal injection site and at least one signal sensing site on its exterior. In one embodiment, the signal injection site has a touch sensor that detects when a part of a user's hand is touching the signal injection site, and a signal injector that injects a signal into a user's hand for a prescribed period of time whenever it is detected that the aforementioned part of a user's hand is touching the signal injection site. In one embodiment, each signal sensing site has a signal sensor that captures a signal emanating from a finger of the either of the user's hands that is touching the signal sensing site during at least the period of time the aforementioned signal is injected into the user's hand. The captured signal is caused by the injected signal traveling through the user's body to the finger. The electric signal propagation through the human body depends on the body composition (e.g., body fat, hard/soft tissue, bone structure, and more). As body composition is quite unique, the electric signal captured through the human body (fingers in this case) can be quite unique to that given body, and therefore can be used to identify users.

In general, the captured signal or signals are analyzed to determine whether they match, to a prescribed degree, a pre-established signal model that is indicative of a signal or signals expected to be captured from a user's finger or fingers that are touching the signal sensing site or sites during at least the period of time the injected signal is injected into the user's hand. In one embodiment, the signal matching determination is employed to authenticate a user of the handheld mobile computing device, and in another embodiment, the determination is used to identify which finger of a user's hand is touching the computing device.

With regard to authenticating a user, in one implementation this involves using the handheld mobile computing device to first detect whether a part of a user's hand is touching the aforementioned signal injection site. If it is detected that a part of a user's hand is touching the signal injection site, a signal is injected into that part of the user's hand for a prescribed period of time. Signals emanating from a part or parts of either of the user's hands (e.g., fingers) that are touching one or more of the aforementioned signal sensing sites are captured during at least the period of time the injected signal is injected into the user's hand. It is next determined whether the captured signals match, to a prescribed degree, a pre-established signal model that is indicative of signals expected to be captured from the part or parts of the user's hands that are touching the one or more signal sensing sites during at least the period of time the injected signal is injected. If it is determined the captured signals match to the prescribed degree, the user is authenticated as an authorized user of the handheld mobile computing device.

With regard to identifying which finger of a user's hand is touching a handheld mobile computing device, in one implementation this involves using the handheld mobile computing device to first detect whether a part of a user's hand is touching the aforementioned signal injection site. If it is detected that a part of a user's hand is touching the signal injection site, a signal is injected into that part of the user's hand for a prescribed period of time. A signal emanating from a finger of either of the user's hands that is touching a signal sensing site on the exterior of the handheld mobile is captured during at least the period of time the injected signal is injected into the user's hand. It is then determined whether the captured signal matches, to a prescribed degree, a one of one or more signal sub-models included in a pre-established signal model. Each of the signal sub-models is indicative of a signal expected to be captured from a different finger of the user's hands whenever that finger is touching the signal sensing site during at least the period of time the signal is injected. If it is determined that the captured signal matches, to the prescribed degree, one of the one or more signal sub-models, the finger associated with that sub-model is designated as touching the handheld mobile computing device.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

Figure 1A:
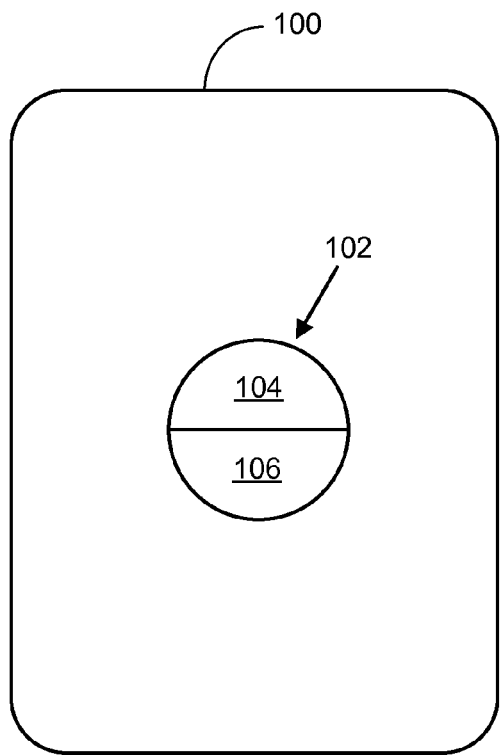
FIGS. 1A-B are diagrams depicting the back and front, respectively, of one exemplary handheld mobile computing device that is suitable for use with the biometric authentication and touch technique embodiments described herein.

In the following description of biometric authentication and touch differentiation technique embodiments, reference is made to the accompanying drawings which form a part hereof, and in which are shown, by way of illustration, specific embodiments in which the technique may be practiced. It is understood that other embodiments may be utilized and structural changes may be made without departing from the scope of the technique.

It is also noted that for the sake of clarity specific terminology will be resorted to in describing the biometric authentication and touch differentiation embodiments described herein and it is not intended for these embodiments to be limited to the specific terms so chosen. Furthermore, it is to be understood that each specific term includes all its technical equivalents that operate in a broadly similar manner to achieve a similar purpose. Reference herein to "one embodiment", or "another embodiment", or an "exemplary embodiment", or an "alternate embodiment", or "one implementation", or "another implementation", or an "exemplary implementation", or an "alternate implementation" means that a particular feature, a particular structure, or particular characteristics described in connection with the embodiment or implementation can be included in at least one embodiment of the biometric authentication and touch differentiation technique. The appearances of the phrases "in one embodiment", "in another embodiment", "in an exemplary embodiment", "in an alternate embodiment", "in one implementation", "in another implementation", "in an exemplary implementation", "in an alternate implementation" in various places in the specification are not necessarily all referring to the same embodiment or implementation, nor are separate or alternative embodiments/implementations mutually exclusive of other embodiments/implementations. Yet furthermore, the order of process flow representing one or more embodiments or implementations of the biometric authentication and touch differentiation technique does not inherently indicate any particular order nor imply any limitations of the technique.

1.0 Biometric Authentication and Touch Differentiation Technique

Biometric authentication and touch differentiation technique embodiments described herein generally involve injecting a low power signal into the hand of a handheld mobile computing device user for a prescribed period of time, as soon as it is detected that the user has started interacting with the device and while the interaction is being detected. The injected signal travels through the user's body and is modified along the way owing to physical attributes of the human body such as body fat, muscle, tissue, bones, and so on. The modified signal is captured during at least the period of time the injected signal is being injected. More particularly, it is captured at one or more sensing sites on the exterior of the mobile computing device that a part of the users hand is touching. Injecting a signal and capturing the resulting modified signal can be characterized as a form of biometrics, which generally involves measuring and analyzing biological data.

It is noted that the part of the user's hand touching a sensing site can be the user's fingers (which include the user's thumb), and can be on either of the user's hands. It is further noted that owing to the aforementioned physical attributes, the signal emanating from one part of the user's hands will have been modified differently while travelling through the body than a signal emanating from another part of the user's hands. As a result, by examining the captured signal or signals it is possible to establish a signature for a user or for a part of the user's hand that is touching a sensing site of the mobile computing device. This signature can then be used to differentiate users for authentication purposes, or as an added bonus differentiate which of a user's fingers is touching a sensing site on the mobile computing device.

Differentiating between users for authentication purposes, or between which of a user's fingers are touching a handheld mobile computing device is quite advantageous. For example, it reduces or eliminates the need for a user to enter a password to use the mobile device. A user can be authenticated almost instantly when he or she grabs the mobile device. Given the frequency at which people interact with their mobile devices this can be a significant time saving. In addition, it can simplify the authentication process considerably. Further, being able to differentiate which finger is touching the mobile device can facilitate a multi-touch experience. More particularly, a touch-based functionality (e.g., a thumb touch can be made to mean the same thing as a right click maneuver on a traditional computer mouse, or a ring finger touch is like a right click on a mouse while an index finger touch is like a left click, and so on) can be assigned to particular fingers. In this way, when the user touches the mobile device with a particular finger, the functionality assigned to that finger is invoked.

In one embodiment, the injected signal takes the form of an electrical signal, and more particularly, a low power (e.g., tens of micro amperes) sinusoidal electrical signal spanning a prescribed range of frequencies (e.g., 10 KHz-10 MHz, or larger). The aforementioned prescribed period of time that this signal is injected can vary, but in one implementation falls within a range of 50-150 milliseconds. In the case of an electrical signal, the signal injection site on the exterior of the handheld mobile computing device is not the same as any of the one or more signal sensing sites.

In another embodiment, the injected signal takes the form of an ultrasound signal, and more particularly, a high frequency ultrasound signal (e.g., 12 MHz or higher). Here again, the aforementioned prescribed period of time that this signal is injected can vary, but in one implementation falls within a range of hundreds of milliseconds. In the case of an ultrasound signal, the signal injection site on the exterior of the handheld mobile computing device is the same as a sensing site, as it is a reflected ultrasound signal that is captured.

1.1 Handheld Mobile Computing Device

Figure 1B:
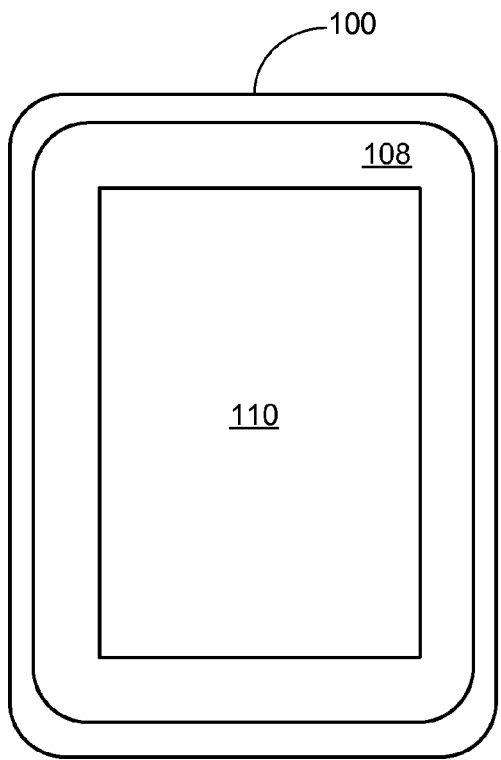

Before the biometric authentication and touch technique embodiments are described, a general description of a suitable handheld mobile computing device environment in which portions thereof may be implemented will be described. Referring to FIGS. 1A-B, one exemplary handheld mobile computing device 100 that is suitable for use with the biometric authentication and touch technique embodiments described herein is shown. FIG. 1A shows the back of the device 100 and FIG. 1B shows the front of the device. As shown in FIG. 1A, the exemplary handheld mobile computing device 100 includes a signal injection site 102 on its exterior. This signal injection site 102 is located on the back of the device 100, although as will be explained later it could be located elsewhere as well. Included in the signal injection site 102 is a signal injection site touch sensor 104, which detects when a part of a user's hand is touching the signal injection site. In addition, the signal injection site 102 includes a signal injector 106, which injects a signal into user's hand for a prescribed period of time if it is detected by the sensor 104 that a part of a user's hand is touching the site 102. It is noted that while FIG. 1A shows the signal injection site 102 to be circular with the upper half being the touch sensor 104 and the lower half being the signal injector 106, other configurations having different sizes, shapes, and demarcations between the sensor and injector, are also possible.

Additionally, a handheld mobile computing device that is suitable for use with the biometric authentication and touch technique embodiments described herein includes one or more a signal sensing sites on its exterior. The exemplary handheld mobile computing device 100 shown in FIG. 1B has one signal sensing site 108 in the form of the device's touchscreen located on the front of the device 100. However, as will be explained later, this signal sensing site 108 could be located elsewhere, and there could be additional signal sensing sites included as well. Included in the signal sensing site 108 is a signal sensor 110 that captures a signal emanating from the finger of the user that is touching the signal sensing site during at least the period of time that the aforementioned injected signal is injected into the user's hand. As described previously, this captured signal is caused by the injected signal traveling through the user's body to his or her finger. It is noted that the user's finger touching the signal sensing site 108 can be on the same hand touching the signal injection site 102, or it can be on the other hand of the user. It is also noted that while FIG. 1B shows the signal sensor 110 to be a rectangular portion of the touchscreen, other configurations having different sizes, shapes, and locations, are also possible.

Figure 2:
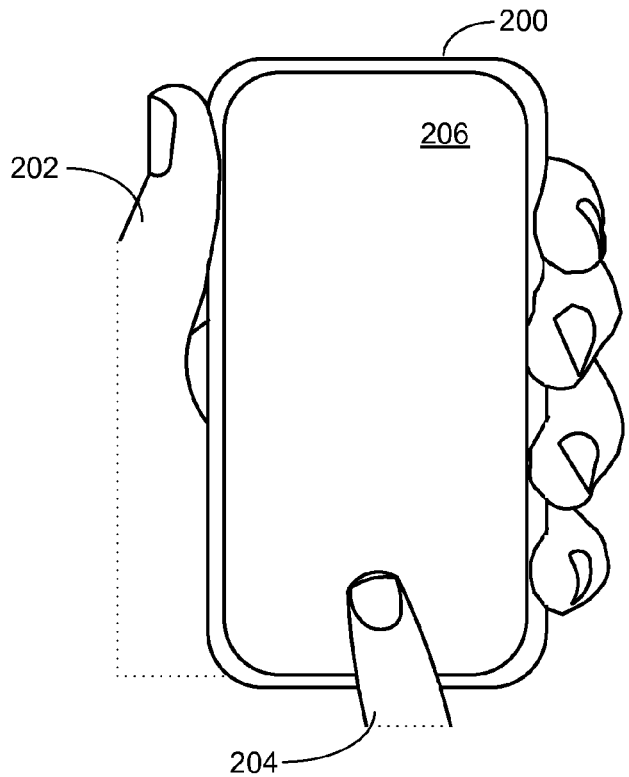
FIG. 2 is a diagram showing how a user might hold the exemplary handheld mobile computing device of FIGS. 1A-B.

Referring to FIG. 2, it is shown how a user might hold the exemplary handheld mobile computing device of FIG. 1. Notice that the user holds the device 200 in one hand 202 such that the aforementioned signal injection site on the back of the device comes into contact with the user's palm. In addition, a finger 204 of the user's other hand touches the touchscreen 206 located on the front of the device 200. As indicated previously, the touchscreen 206 acts as the aforementioned signal sensing site.

Figure 3:
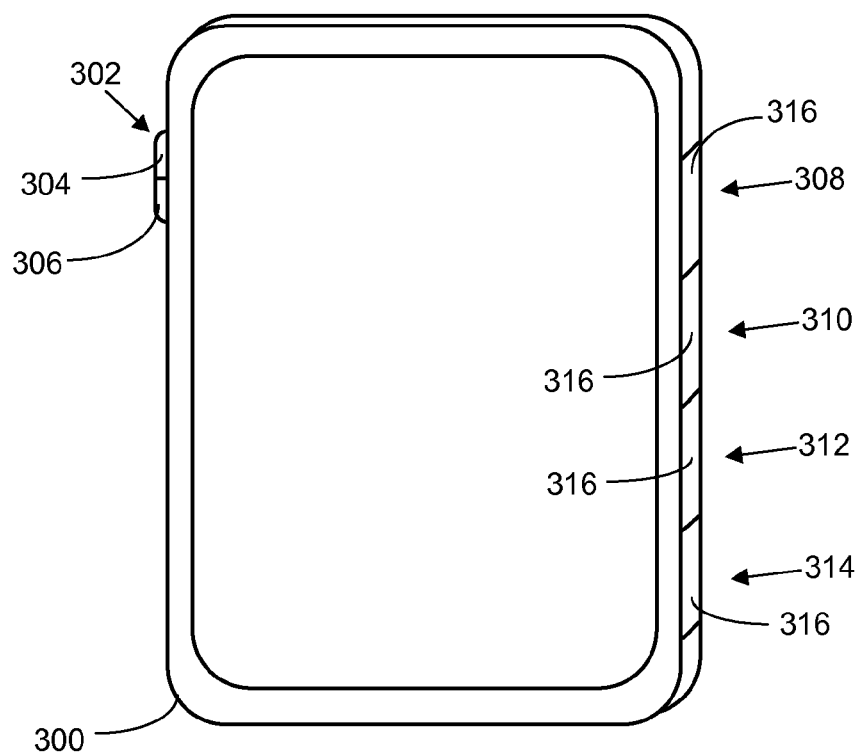
FIG. 3 is a diagram depicting another exemplary handheld mobile computing device that is suitable for use with the biometric authentication and touch technique embodiments described herein.

Referring now to FIG. 3, another exemplary handheld mobile computing device 300 that is suitable for use with the biometric authentication and touch technique embodiments described herein is described. In this exemplary embodiment, the aforementioned signal injection site 302 is located on the edge of the device 300, and corresponds to a power button of the device. As with the previous embodiment, the signal injection site 302 includes a signal injection site touch sensor 304, which detects when a part of a user's hand is touching the signal injection site. In addition, the signal injection site 302 includes a signal injector 306, which injects a signal into user's hand for a prescribed period of time if it is detected by the sensor 304 that a part of a user's hand is touching the site 302. It is noted that while FIG. 3 shows the signal injection site 302 to be a rectangular button with the upper half being the touch sensor 304 and the lower half being the signal injector 306, other configurations having different sizes, shapes, and demarcations between the sensor and injector, are also possible.

The exemplary handheld mobile computing device 300 depicted in FIG. 3 also includes multiple signal sensing sites 308, 310, 312, 314 on its exterior. However, it is noted that fewer or more signal sensing sites could be included, and each included sensing site could be located elsewhere on the exterior of the handheld mobile computing device. Included in each of the signal sensing sites 308, 310, 312, 314 is a signal sensor 316 that captures a signal emanating from the finger of the user that is touching the signal sensing site during at least the period of time that the aforementioned injected said signal is injected into the user's hand. It is noted that the user's finger that is touching one of the signal sensing sites 308, 310, 312, 314 can be on the same hand touching the signal injection site 302, or it can be on the other hand of the user. It is also noted that while FIG. 3 shows the signal sensors 316 to be rectangular areas on the side of the mobile device 300, other configurations having different sizes, shapes, and locations, are also possible.

Figure 4:
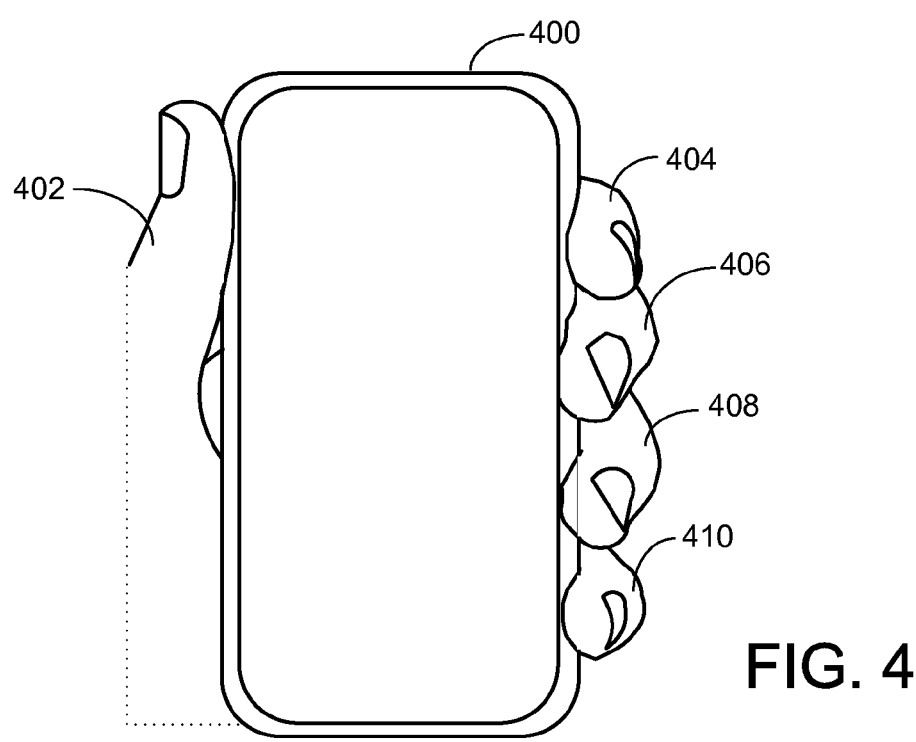
FIG. 4 is a diagram showing how a user might hold the exemplary handheld mobile computing device of FIG. 3.

Referring to FIG. 4, it is shown how a user might hold the exemplary handheld mobile computing device of FIG. 3. In this case, the user holds the device 400 such that his or her thumb 402 is touching the power button located on one side of the device 400. As indicated previously, the power button acts as the aforementioned signal sensing site. In addition, the four fingers of the user's same hand 404, 406, 408, 410 are respectively touching the previously described signal sensing sites that are located on the side of the device 400 opposite the power button.

1.2 Biometric Authentication and Touch Differentiation Processes

Figure 5:
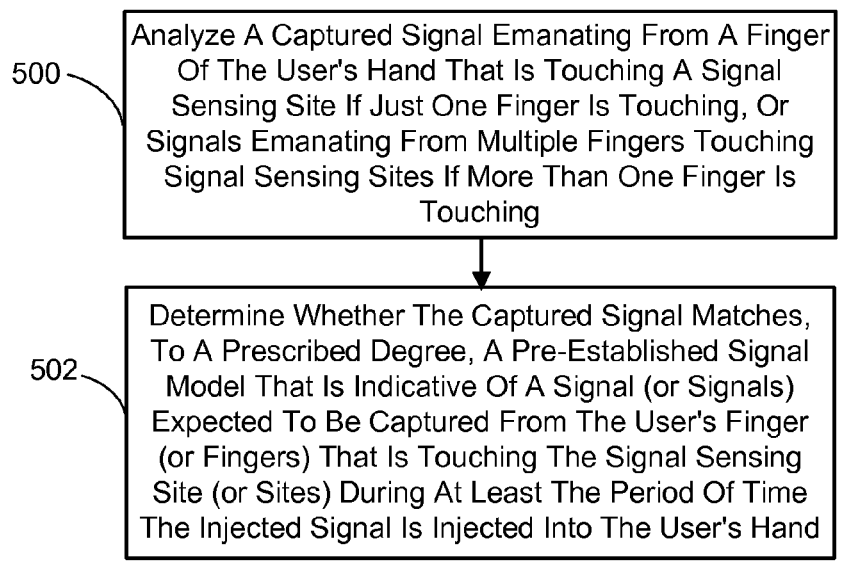
FIG. 5 is a flow diagram generally outlining one embodiment of a process for determining whether a captured signal matches a pre-established signal model.

The biometric authentication and touch technique embodiments described herein are implemented via processes executed using the above-described handheld mobile computing device. Generally, as shown in FIG. 5, a process to implement the biometric authentication and touch technique embodiments described herein involves using the computing device to analyze a captured signal emanating from a finger of the user's hand that is touching a signal sensing site if just one finger is touching, or signals emanating from multiple fingers touching signal sensing sites if more than one finger is touching (process action 500). It is then determined whether the captured signal (or signals) matches, to a prescribed degree, a pre-established signal model that is indicative of a signal (or signals) expected to be captured from the user's finger (or fingers) that is touching the signal sensing site (or sites) during at least the period of time the injected signal is injected into the user's hand (process action 502).

This determination of whether the captured signal (or signals) matches the pre-established signal model can then be used to differentiate users for authentication purposes, or differentiate which of a user's fingers is touching a sensing site on the handheld mobile computing device. The sections to follow describe the authentication and differentiation processes in more detail.

1.2.1 Biometric Authentication

Figure 6:
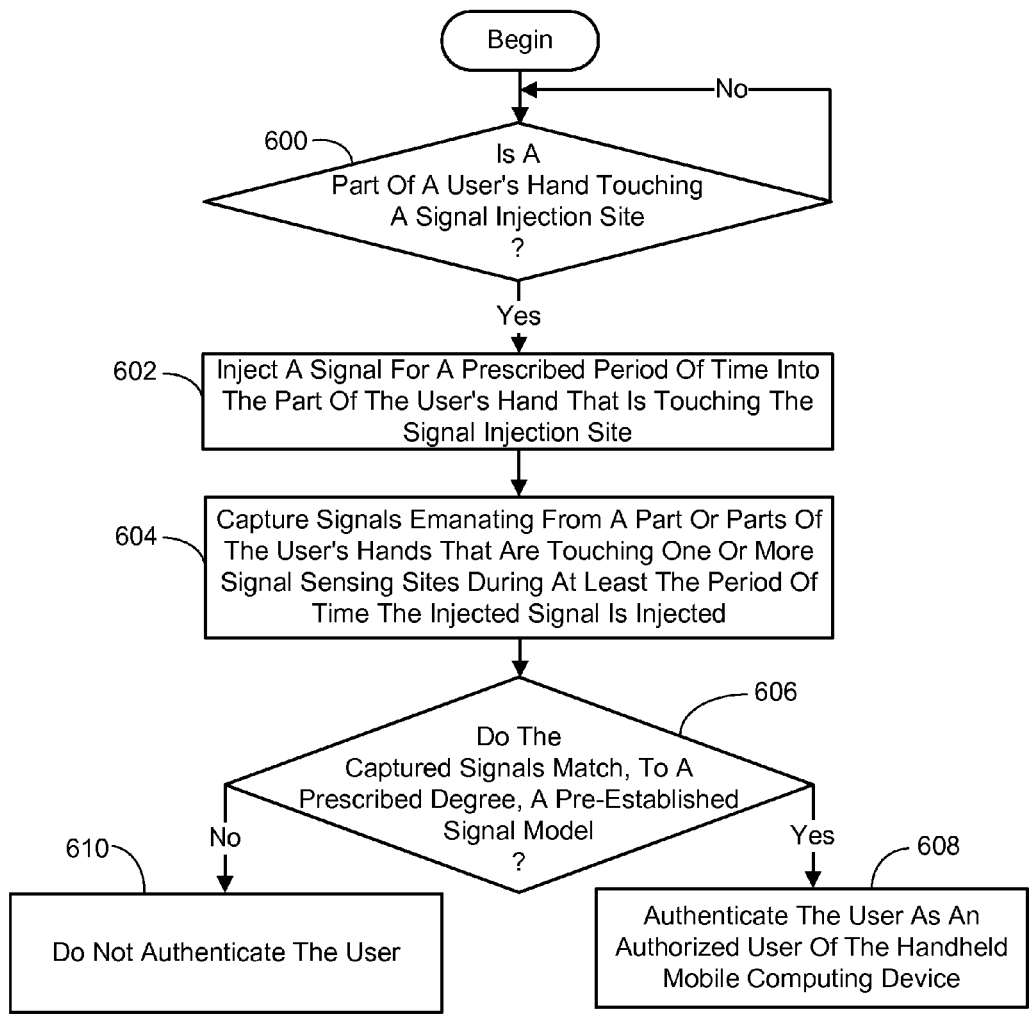
FIG. 6 is a flow diagram generally outlining one embodiment of a process for authenticating a user of a handheld mobile computing device.

Given the foregoing, in one embodiment, authenticating a user of a handheld mobile computing device involves using the computing device to perform the following process. Referring to FIG. 6, it is first detected whether a part of a user's hand is touching a signal injection site on the exterior of the handheld mobile computing device (process action 600). If not, the detection action is repeated. However, if a user's hand is detected, then a signal is injected for a prescribed period of time into the part of the user's hand that is touching the signal injection site (process action 602). Signals emanating from a part or parts of the user's hands that are touching one or more signal sensing sites on the exterior of the handheld mobile computing device are captured during at least the period of time the aforementioned signal is injected (process action 604). As described previously, the signals being captured are caused by the injected signal traveling through the user's body. It is noted that the part or parts of the user's hand that are touching one or more signal sensing sites can take on several configurations. For example, the parts or parts of the user's hands can be the user's finger or fingers. The finger or fingers can be from either hand. In addition, when multiple fingers are involved, they can be from both hands. Further, when multiple fingers are involved, they can be touching the same signal sensing site, or multiple sensing sites. In one configuration, each finger would be touching a different signal sensing site.

Once the aforementioned signals are captured, it is determined whether they match, to a prescribed degree, a pre-established signal model (process action 606). The signal model is indicative of signals expected to be captured from the part or parts of the user's first or second hand that are touching the one or more signal sensing sites during at least the period of time the injected signal is injected into the user's hand. If it is determined that the captured signals match to the prescribed degree, the user is authenticated as an authorized user of the handheld mobile computing device (process action 608). If it is determined that the captured signals do not match to the prescribed degree, the user is not authenticated (process action 610).

Figure 7:
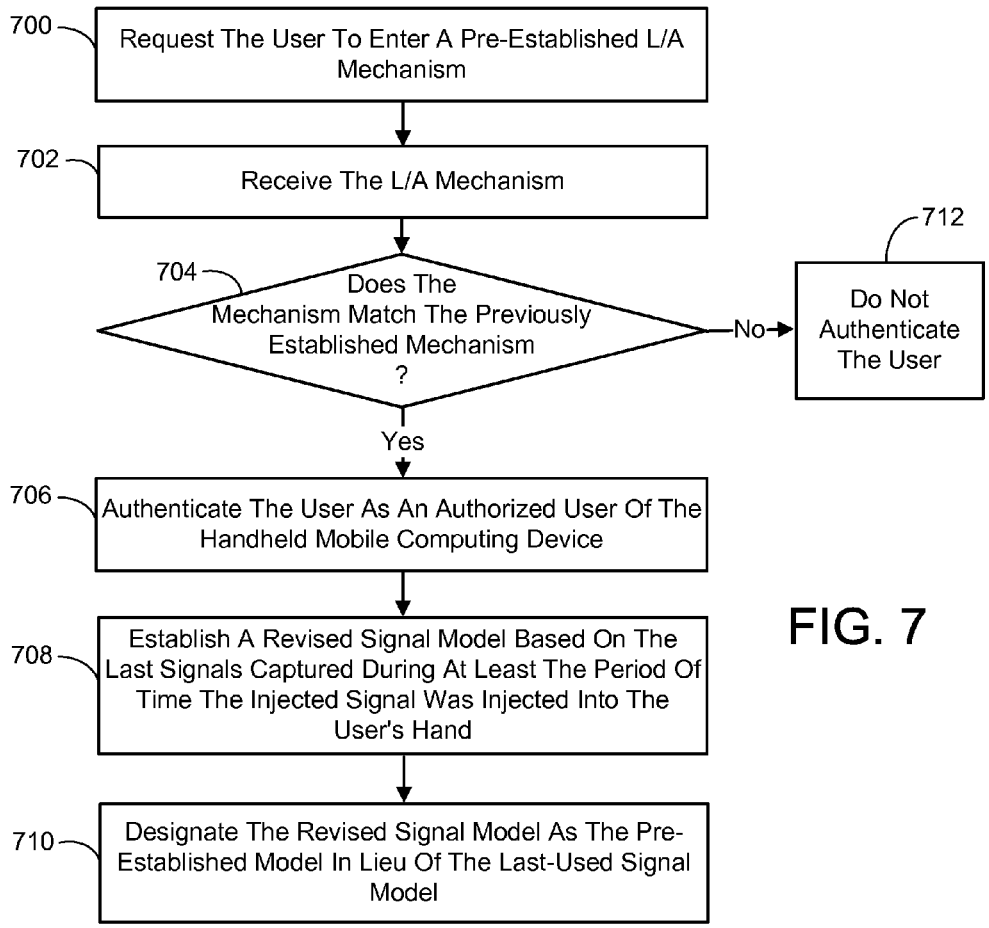
FIG. 7 is a flow diagram generally outlining one embodiment of a process for establishing a revised signal model when the captured signals do not match the pre-established signal model to the prescribed degree.

It is noted, however, that the captured signals may exhibit significant variations over time owing to changes in conditions within the body of the user (e.g., blood pressure, hydration levels, and so on) and in the surrounding environment (temperature, humidity, and so on). These changes can become severe enough that the captured signals will not match, to the prescribed degree, the previously established signal model—even if the prescribed degree of matching is not overly restrictive. Thus, if it is determined in the foregoing process that the captured signals do not match the pre-established signal model to the prescribed degree, then, in one embodiment, the following procedure is used. Referring to FIG. 7, the user is requested via conventional user-interfaces of the handheld mobile computing device to enter a pre-established locking and/or authenticating (L/A) mechanism, such as a password or a biometric (process action 700). The entered L/A mechanism is received (process action 702), and it is determined if it matches the previously established L/A mechanism (process action 704). If it does match, the user is authenticated as an authorized user of the handheld mobile computing device (process action 706). In addition, a revised signal model is established based on the last signals captured during at least the period of time the injected signal was injected into the user's hand (process action 708). The revised signal model is then designated as the pre-established model in lieu of the last-used signal model (process action 710). As before, the revised signal model is indicative of signals expected to be captured from the part or parts of the user's hands that are touching the one or more signal sensing sites on the exterior of the handheld mobile computing device during at least the period of time said signal is injected into the user's hand. If, however, it is found in process action 704 that the received L/A mechanism does not match the previously established L/A mechanism, then the user is not authenticated (process action 712).

With regard to the pre-established signal model, in general this model represents a maximum degree of variation between the injected signal and the captured signals that is deemed to still be indicative that the user is the authorized user of the handheld mobile computing device. In one embodiment, the signal model is created by simply using the raw electrical signals captured from the user in the past as the actual model. When any user interacts with the device, the electric signal captured from one or more parts of the user's body is compared against the pre-recorded electric signals. Similarity between these raw electrical signals (how close two signals are are) can be computed in multiple ways (e.g., computing the cross-correlation between the raw signals). This similarity is used to directly determine whether the variation between the injected signal and the captured signals is equal to or less than the maximum degree of variation using the raw signal data. If the variation is low, the user is automatically authenticated.

In another embodiment, the pre-established signal model is a pre-established signal characteristics model that is indicative of the prescribed signal characteristics expected to be captured from the part or parts of the user's hands that are touching the one or more signal sensing sites on the exterior of the handheld mobile computing device during at least the period of time the injected signal is injected into the user's hand. In the case where the injected signal is an electrical signal, the signal characteristics can include, but are not limited to, one or more of the voltage drop, phase offset, bio-impedance characteristics (e.g., resistance, reactance, impedance, and so on). These characteristics can be measured for one or more prescribed frequencies within the frequency range of the injected signal. In the case where the injected signal is an ultrasonic signal, the signal characteristics can include, but are not limited to, one or more of amplitude, amplitude variation, power density in the frequency domain as represented by spectral bandwidth, spectral flux, and spectral centroid.

Figure 8:
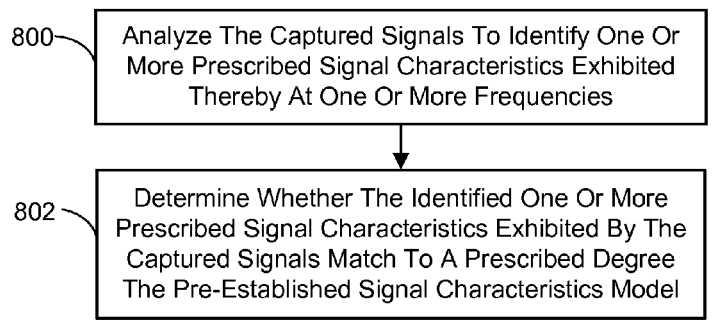
FIG. 8 is a flow diagram generally outlining an implementation of the part of the process of FIG. 6 involving the determination of whether captured signals match a pre-established signal characteristics model.

Given the foregoing, in one implementation of the signal characteristic embodiment shown in FIG. 8, determining whether the captured signals match the pre-established signal characteristics model to a prescribed degree involves first analyzing the captured signals to identify one or more prescribed signal characteristics exhibited thereby at one or more frequencies (process action 800). It is then determined whether the identified one or more prescribed signal characteristics exhibited by the captured signals match to a prescribed degree the pre-established signal characteristics model (process action 802). It is noted that conventional methods are employed to create the signal characteristics model and to compare the model to the captured signals.

It is further noted that the above-described signal models are trained using conventional methods which generally entail a user holding the handheld mobile computing device in the manner he or she will when attempting authentication once the model is created. This will include the injected signal being injected and capturing the signals emanating from the part or parts of the user's hands that are touching the one or more signal sensing sites on the exterior of the handheld mobile computing device during at least the period of time said signal is injected into the user's hand. This process may be repeated a number of times and the captured signals combined (e.g., averaged or cross-checked) to create a representative captured signal.

In one embodiment, a signal is captured at each of the signal sensing sites that have a part or parts of the user's hand touching the site. Thus, if more than one signal sensing site is involved, a signal will be captured at each site. In one implementation, the captured signals are combined to produce a single captured signal for training the signal model. However, in another implementation, the captured signals are processed separately to train a series of sub-models—one for each signal sensing site. These sub-models make up the aforementioned pre-established signal model, and each sub-model is indicative of a signal expected to be captured from the part or parts of the user's hand(s) that are touching the signal sensing site associated with the sub-model.

Figure 9:
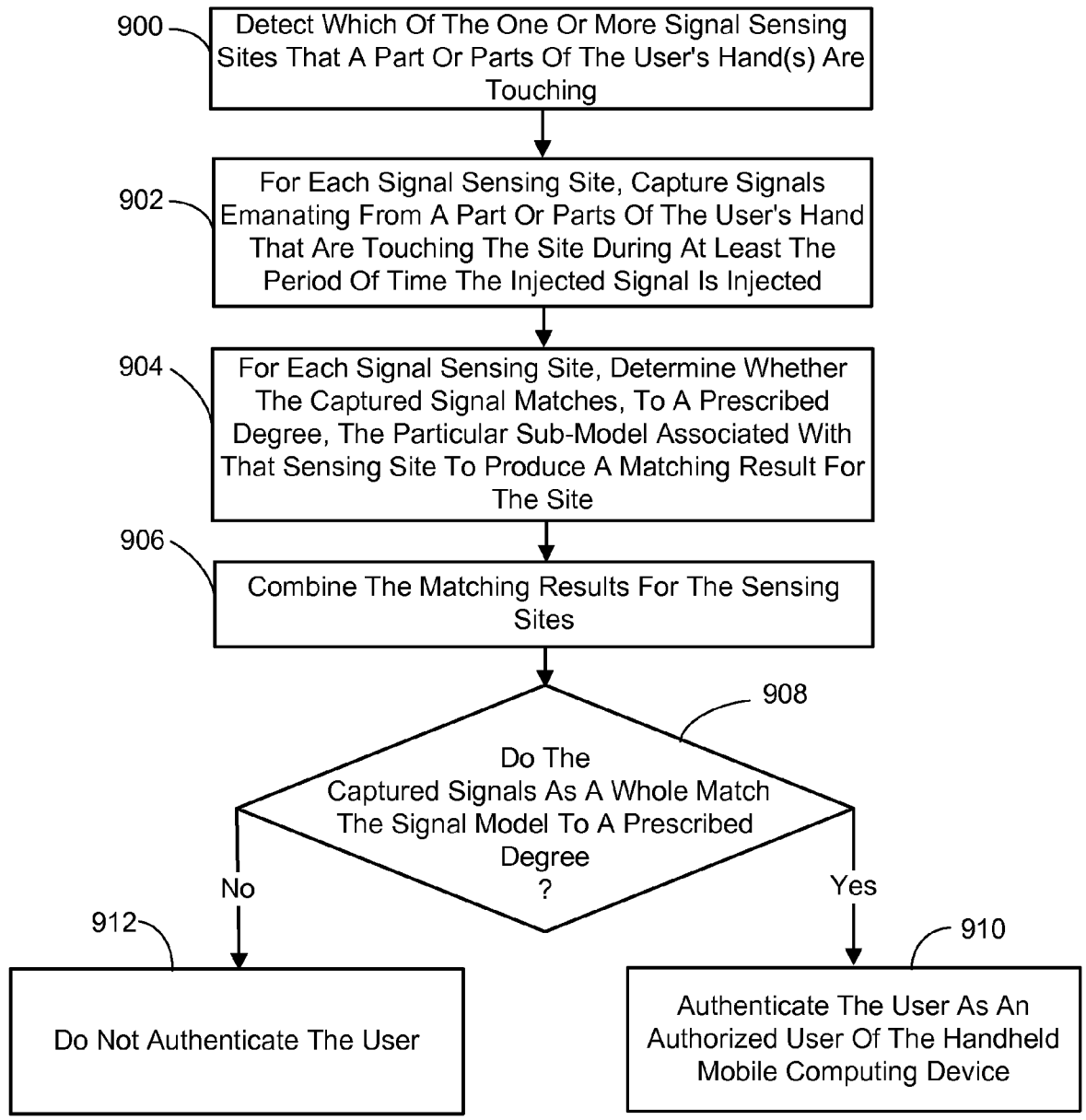
FIG. 9 is a flow diagram generally outlining one embodiment of a process for authenticating a user of a handheld mobile computing device when more than one signal sensing site is involved.

When more than one signal sensing site is involved, it can also be advantageous to know which of the sites have a part or parts of the user's hand touching the site, to facilitate creating the aforementioned separate sub-models. In addition, since there are multiple sensing sites to deal with, the foregoing capturing and matching actions are somewhat different. More particularly, referring to FIG. 9, in one embodiment once the injected signal has been injected as described previously, it is detected which of the one or more signal sensing sites that a part or parts of the user's hand(s) are touching (process action 900). For each signal sensing site being touched, signals emanating from a part or parts of the user's hand that are touching that site are captured during at least the period of time the injected signal is injected (process action 902). It is then determined for each of the sensing sites whether the captured signal matches, to a prescribed degree, the particular sub-model associated with that sensing site to produce a matching result for the site (process action 904). The matching results for the sensing sites are then combined (process action 906), and it is determined if the captured signals as a whole match the signal model to a prescribed degree (process action 908). If the captured signals as a whole are determined to match the signal model to a prescribed degree, the user is authenticated as an authorized user of the handheld mobile computing device (process action 910). If not, the user is not authenticated (process action 912). It is noted that determining if the combined matching result indicates the captured signals as a whole match the signal model to a prescribed degree can be accomplished in a number of ways. For example, but without limitation, in one implementation, the matching result from each sensing site must indicate that the signal captured at that site matches, to a prescribed degree, the sub-model associated with the site, in order for the captured signals as a whole to be deemed to match the signal model to the prescribed degree. In another implementation, user authentication can be achieved if the signal captured from a single sensing site is very close to that of a sub-model.

1.2.2 Biometric Touch Differentiation

Figure 10:
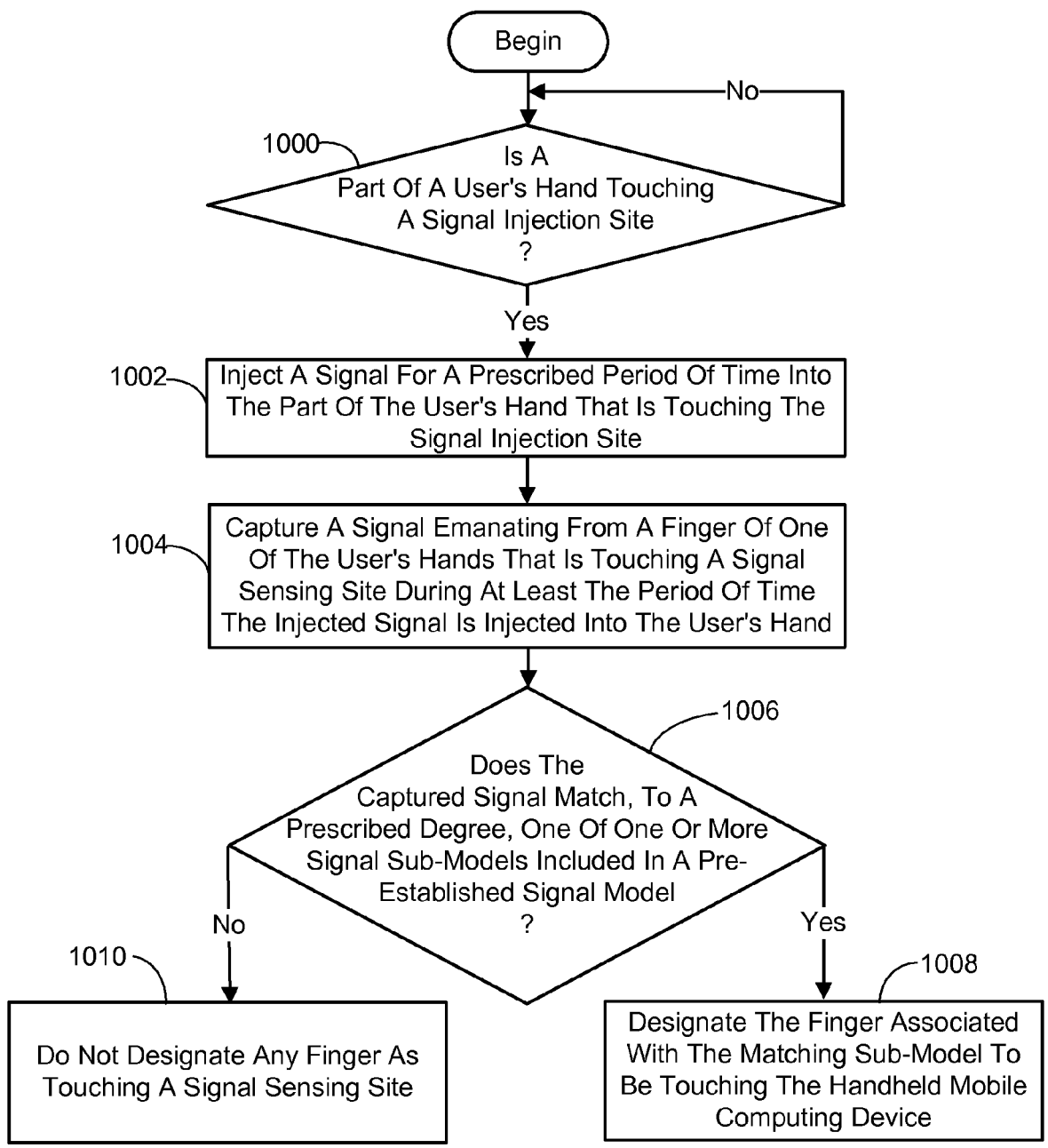
FIG. 10 is a flow diagram generally outlining one embodiment of a process for differentiating which of a user's fingers is touching a sensing site on a handheld mobile computing device.

With regard to differentiating which of a user's fingers is touching a sensing site on a handheld mobile computing device, in one general embodiment, this involves using the computing device to perform the following process. Referring to FIG. 10, it is first detected whether a part of a user's hand is touching a signal injection site on the exterior of the handheld mobile computing device (process action 1000). If not, the detection action is repeated. However, if the user's hand is detected, then a signal is injected for a prescribed period of time into the part of the user's hand that is touching the signal injection site (process action 1002). A signal emanating from a finger of one of the user's hands that is touching a signal sensing site is captured during at least the period of time the injected signal is injected into the user's hand (process action 1004). As indicated previously, the signal being captured is caused by the injected signal traveling through the user's body. It is noted that the finger that is touching a signal sensing site can be from either hand. Thus, the finger can be on the same hand that is injected with the signal, or on the user's other hand.

Once the aforementioned signal is captured, it is determined whether it matches, to a prescribed degree, one of one or more signal sub-models included in a pre-established signal model (process action 1006). Each of the signal sub-models is indicative of a signal expected to be captured from a different finger of the user's hands whenever that finger is touching the signal sensing site during at least the period of time said signal is injected into the user's hand. If it is determined that the captured signal matches, to the prescribed degree, one of the one or more signal sub-models, the finger associated with that sub-model is designated to be touching the handheld mobile computing device (process action 1008). If, however, it is determined that the captured signal does not match, to the prescribed degree, any of the one or more signal sub-models, then no finger is designated (process action 1010).

As described previously, identifying which of a user's fingers is touching a handheld mobile computing device has advantages, when for example, a separate touch functionality has been assigned to each finger of the user's hands having an associated signal sub-model. In other words, when it is designated that a finger associated with a sub-model is touching the handheld mobile computing device, the touch functionality assigned to that finger is invoked.

With regard to the signal sub-models of the pre-established signal model, in general each of these sub-models represents a maximum degree of variation between the injected signal and the captured signals that is deemed to still be indicative that the finger associated with the sub-model is touching the handheld mobile computing device. In one embodiment, the signal sub-model is created by simply using the raw electrical signals captured from the user in the past as the actual model. When any user interacts with the device the electric signal captured from one or more parts of the user's body is compared against the pre-recorded electric signals. Similarity between these raw electrical signals (how close two signals are are) can be computed in multiple ways (e.g., computing the cross-correlation between the raw signals). This similarity is used to directly determine whether the variation between the injected signal and the captured signals is equal to or less than the maximum degree of variation using the raw signal data. If the variation is low, the user is automatically authenticated.

In another embodiment, each signal sub-model is a signal characteristics sub-model that is indicative of prescribed signal characteristics expected to be captured from the finger associated with the sub-model whenever it is touching a signal sensing site during at least the period of time said signal is injected into the user's hand. As with the authentication embodiments, in the case where the injected signal is an electrical signal, the signal characteristics can include, but are not limited to, one or more of the voltage drop, phase offset, bioimpedance characteristics (e.g., resistance, reactance, impedance, and so on). These characteristics can be measured for one or more prescribed frequencies within the frequency range of the injected signal. In the case where the injected signal is an ultrasonic signal, the signal characteristics can include, but are not limited to, one or more of amplitude, amplitude variation, power density in the frequency domain as represented by spectral bandwidth, spectral flux, and spectral centroid.

Figure 11:
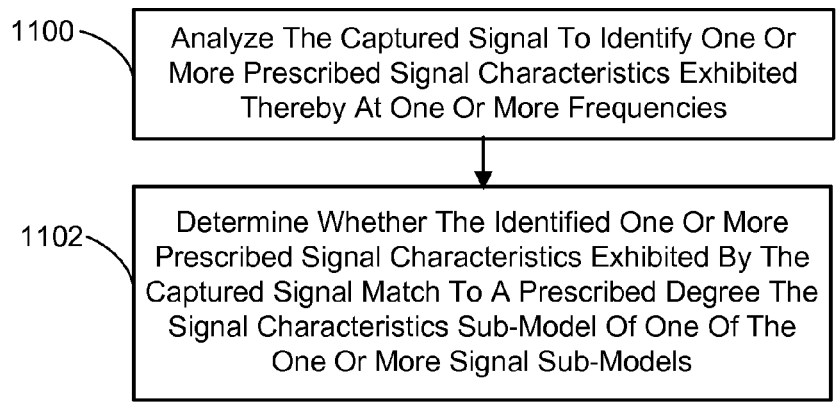
FIG. 11 is a flow diagram generally outlining an implementation of the part of the process of FIG. 10 involving the determination of whether captured signals match a pre-established signal characteristics model.

Given the foregoing, in one implementation of the signal characteristic embodiment shown in FIG. 11, determining whether the captured signal matches one of the signal characteristics sub-models to a prescribed degree involves first analyzing the captured signal to identify one or more prescribed signal characteristics exhibited thereby at one or more frequencies (process action 1100). It is then determined whether the identified one or more prescribed signal characteristics exhibited by the captured signal match to a prescribed degree the signal characteristics sub-model of one of the one or more signal sub-models (process action 1102). It is noted that conventional methods are employed to create the signal characteristics sub-models and to compare these models to the captured signal.

The aforementioned signal sub-models are trained using conventional methods which generally entail, for each sub-model being trained, a user holding the handheld mobile computing device in the manner he or she will when attempting to invoke a particular touch functionality once the sub-models are created. This will include the injected signal being injected and capturing the signal emanating from a user's finger that is touching a signal sensing site on the exterior of the handheld mobile computing device during at least the period of time the signal is injected into the user's hand. The finger touching a signal sensing site is the finger that is to be associated with the sub-model being trained. This process may be repeated a number of times and the captured signals combined (e.g., averaged) to create a representative captured signal. If there are multiple sensing sites on the exterior of the handheld mobile computing device, any of the sites can be used to train the sub-models.

Figure 12:
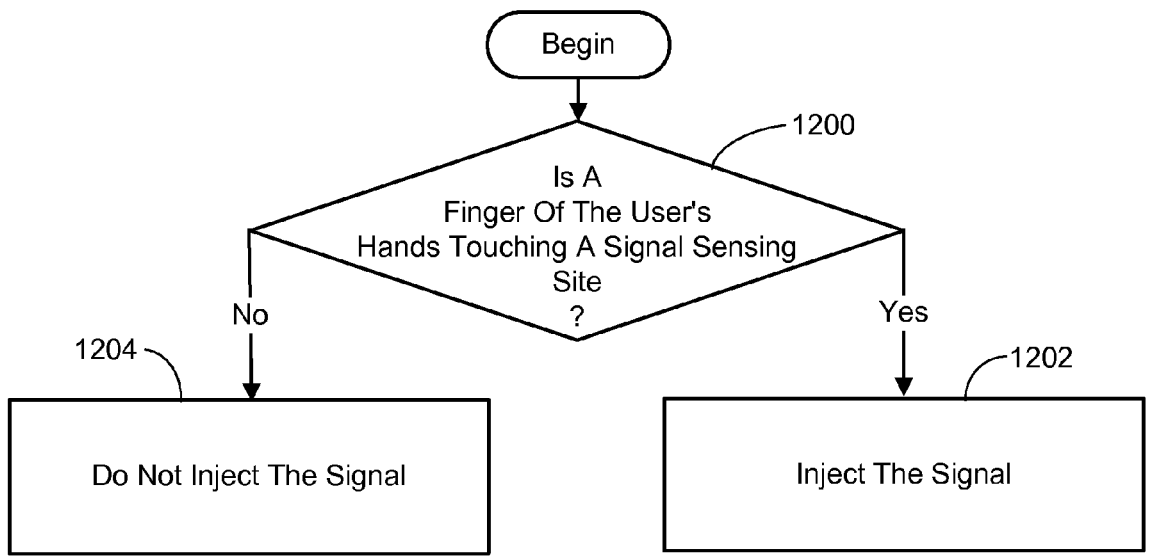
FIG. 12 is a flow diagram generally outlining an implementation of the part of the process of FIG. 10 involving not injecting a signal into the user's hand if one of the user's fingers is not touching a sensing site on the handheld mobile computing device, even if it is detected that the user's hand is touching the signal injection site.

It is noted that it is not necessary to inject a signal into the user's hand if one of the user's fingers is not touching a sensing site on the handheld mobile computing device, even if it is detected that the user's hand is touching the signal injection site. Thus, referring to FIG. 12, in one embodiment, in order to save power, prior to injecting a signal into the user's hand, it is periodically detected whether a finger of the user's hands is touching a signal sensing site on the exterior of the handheld mobile computing device (process action 1200). If a finger is touching a sensing site, then the signal is injected (process action 1202). However, if no finger is touching a sensing site, then the signal is not injected (process action 1204).

2.0 Exemplary Operating Environments

Figure 13:
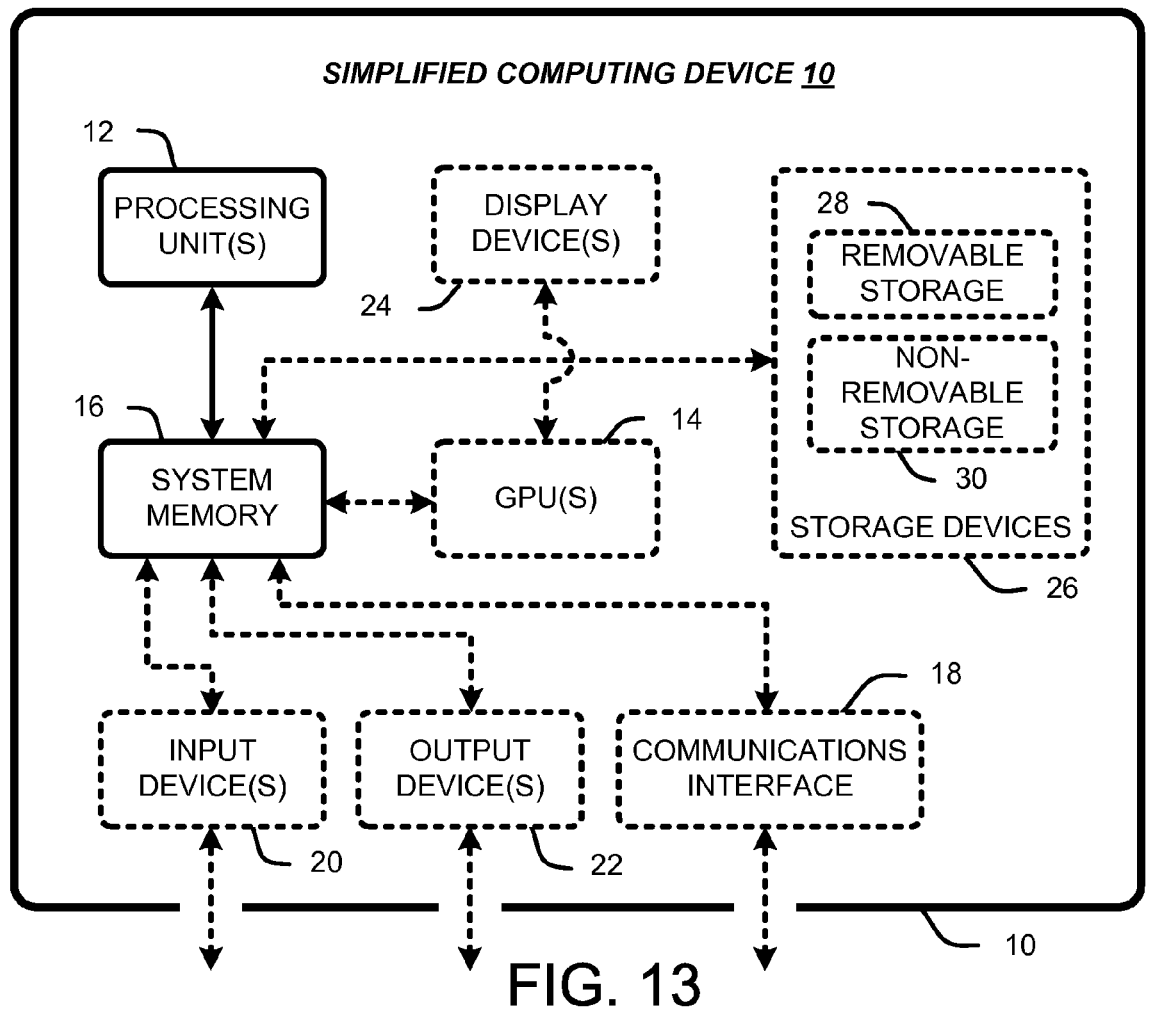
FIG. 13 is a diagram depicting a general purpose computing device constituting an exemplary system for implementing biometric authentication and touch differentiation technique embodiments described herein.

The biometric authentication and touch differentiation technique embodiments described herein are operational within numerous types of general purpose or special purpose handheld mobile computing device environments or configurations. FIG. 13 illustrates a simplified example of a general-purpose computer device on which various embodiments and elements of the biometric authentication and touch differentiation technique embodiments, as described herein, may be implemented. It should be noted that any boxes that are represented by broken or dashed lines in FIG. 13 represent alternate embodiments of the simplified computing device, and that any or all of these alternate embodiments, as described below, may be used in combination with other alternate embodiments that are described throughout this document.

For example, FIG. 13 shows a general system diagram showing a simplified handheld mobile computing device 10. Such computing devices can be typically found in devices having at least some minimum computational capability, including, but not limited to, laptop or mobile computers, communications devices such as cell phones and PDA's, multiprocessor systems, microprocessor-based systems, programmable consumer electronics, network PCs, minicomputers, audio or video media players, etc.

To allow a device to implement the biometric authentication and touch differentiation technique embodiments described herein, the device should have a sufficient computational capability and system memory to enable basic computational operations. In particular, as illustrated by FIG. 13, the computational capability is generally illustrated by one or more processing unit(s) 12, and may also include one or more GPUs 14, either or both in communication with system memory 16. Note that that the processing unit(s) 12 of the general computing device may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 13 may also include other components, such as, for example, a communications interface 18. The simplified computing device of FIG. 13 may also include one or more conventional computer input devices 20 (e.g., pointing devices, keyboards, audio input devices, video input devices, haptic input devices (such as a touchscreen), devices for receiving wired or wireless data transmissions, etc.). The simplified computing device of FIG. 13 may also include other optional components, such as, for example, one or more conventional display device(s) 24 and other computer output devices 22 (e.g., audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 13 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying some or all of the various biometric authentication and touch differentiation technique embodiments described herein, or portions thereof, may be stored, received, transmitted, or read from any desired combination of computer or machine readable media or storage devices and communication media in the form of computer executable instructions or other data structures.

Finally, the biometric authentication and touch differentiation technique embodiments described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for authenticating a user of a handheld mobile computing device, comprising:
using the handheld mobile computing device to perform the following process actions:
detecting whether a part of a user's first hand is touching a signal injection site on the exterior of the handheld mobile computing device;
whenever it is detected that said part of a user's first hand is touching the signal injection site, injecting a signal into that part of the user's first hand for a prescribed period of time;
capturing signals emanating from a part or parts of the user's first or second hand that are touching one or more signal sensing sites on the exterior of the handheld mobile computing device during at least the period of time said signal is injected into the user's first hand, said captured signals being caused by the injected signal traveling through the user's body;
determining whether the captured signals match, to a prescribed degree, a pre-established signal model that is indicative of signals expected to be captured from said part or parts of the user's first or second hand that are touching one or more signal sensing sites on the exterior of the handheld mobile computing device during at least the period of time said signal is injected into the user's first hand; and
whenever it is determined that the captured signals match to the prescribed degree, authenticating the user as an authorized user of the handheld mobile computing device.

2. The process of claim 1, wherein the pre-established signal model represents a maximum degree of variation between the injected signal and the captured signals that is deemed to still be indicative that the user is the authorized user of the handheld mobile computing device, and wherein the process action of determining whether the captured signal matches, to a prescribed degree, a pre-established signal model, comprises determining whether the variation between the injected signal and the captured signals is equal to or less than said maximum degree of variation.

3. The process of claim 1, wherein the pre-established signal model comprises a pre-established signal characteristics model that is indicative of the prescribed signal characteristics expected to be captured from said part or parts of the user's first or second hand that are touching one or more signal sensing sites on the exterior of the handheld mobile computing device during at least the period of time said signal is injected into the user's first hand, and wherein the process action of determining whether the captured signals match, to a prescribed degree, a pre-established signal model, comprises:
analyzing the captured signals to identify one or more prescribed signal characteristics exhibited thereby at one or more frequencies;
determining whether the identified one or more prescribed signal characteristics exhibited by the captured signal match to a prescribed degree the pre-established signal characteristics model.

4. The process of claim 1, further comprising:
prior to performing the process action of capturing signals emanating from a part or parts of the user's first or second hand, performing a process action of detecting which of the one or more signal sensing sites on the exterior of the handheld mobile computing device that said part or parts of the user's first or second hand are touching; and wherein the pre-established signal model comprises a plurality of sub-models each of which is indicative of a signal expected to be captured from the part or parts of the user's first or second hand that are touching the detected one or more signal sensing sites; and wherein the process action of determining whether the captured signals match, to a prescribed degree, a pre-established signal model comprises determining whether each captured signal matches, to a prescribed degree, the particular sub-model of the pre-established signal model which is indicative of a signal expected to be captured from the part or parts of the user's first or second hand that are touching the detected one or more signal sensing sites to produce a matching result; and combining the matching results for the sensing sites to determine if the captured signals as a whole match the signal model to a prescribed degree.

5. The process of claim 1, wherein the injected signal is an electrical signal exhibiting a prescribed frequency range, and wherein the signal injection site on the exterior of the handheld mobile computing device is not the same as any of the one or more signal sensing sites.

6. The process of claim 1, wherein the injected signal is an ultrasonic signal.

7. The process of claim 6, wherein there is just one signal sensing site on the exterior of the handheld mobile computing device, and the signal injection site and the signal sensing site are the same site.

8. The process of claim 1, further comprising, whenever it is determined that the captured signals does not match to the prescribed degree, the process actions of:

requesting the user to enter a pre-established locking and/or authenticating (L/A) mechanism using a user input apparatus of the handheld mobile computing device;

receiving the entered L/A mechanism and determining if the L/A mechanism matches a previously established L/A mechanism;

whenever the user-entered L/A mechanism matches the previously established L/A mechanism, authenticating the user as an authorized user of the handheld mobile computing device, establishing a revised signal model that is indicative of signals expected to be captured from said part or parts of the user's first or second hand that are touching one or more signal sensing sites on the exterior of the handheld mobile computing device during at least the period of time said signal is injected into the user's first hand, based on the last signals captured during at least the period of time said signal is injected into the user's first hand, and designating the revised signal model to be said pre-established model in lieu of the last-used signal model.

9. A computer-implemented process for identifying which finger of a user's hand is touching a handheld mobile computing device, comprising:

using the handheld mobile computing device to perform the following process actions:

detecting whether a part of a user's first hand is touching a signal injection site on the exterior of the handheld mobile computing device;

if it is detected that said part of a user's first hand is touching the signal injection site, injecting a signal into that part of the user's first hand for a prescribed period of time;

capturing a signal emanating from a finger of the user's first or second hand that is touching a signal sensing site on the exterior of the handheld mobile computing device during at least the period of time said signal is injected into the user's first hand, said captured signal being caused by the injected signal traveling through the user's body to said finger;

determining whether the captured signal matches, to a prescribed degree, a one of one or more signal sub-models included in a pre-established signal model, each of said signal sub-models being indicative of a signal expected to be captured from a different finger of the user's first or second hand whenever that finger is touching a signal sensing site during at least the period of time said signal is injected into the user's first hand; and whenever it is determined that the captured signal matches, to the prescribed degree, one of the one or more signal sub-models, designating the finger associated with that sub-model to be touching the handheld mobile computing device.

10. The process of claim 9, further comprising, the process actions of:

assigning a separate handheld mobile computing device touch functionality to each finger of the user's first and second hand having a signal sub-model associated therewith; and whenever it is designated that a finger associated with that sub-model is touching the handheld mobile computing device, invoking the touch functionality assigned to that finger.

11. The process of claim 9, wherein each signal sub-model represents a maximum degree of variation between the injected signal and the captured signal that is deemed to still be indicative that the finger associated with the sub-model is touching the handheld mobile computing device, and wherein the process action of determining whether the captured signal matches, to a prescribed degree, a one of the one or more signal sub-models included in a pre-established signal model, comprises determining whether the variation between the injected signal and the captured signal is equal to or less than said maximum degree of variation.

12. The process of claim 9, wherein each signal sub-model comprises a signal characteristics sub-model that is indicative of prescribed signal characteristics expected to be captured from the finger associated with the sub-model whenever it is touching a signal sensing site during at least the period of time said signal is injected into the user's first hand, and wherein the process action of determining whether the captured signal matches, to a prescribed degree, a one of the one or more signal sub-models included in a pre-established signal model, comprises:

analyzing the captured signal to identify one or more prescribed signal characteristics exhibited thereby at one or more frequencies; and determining whether the identified one or more prescribed signal characteristics exhibited by the captured signal match to a prescribed degree the signal characteristics sub-model of a one of the one or more signal sub-models included in a pre-established signal model.

13. The process of claim 9, further comprising, prior to performing the process action of injecting a signal into said part of a user's first hand touching the signal injection site for a prescribed period of time if it is detected that said part of a user's first hand is touching the signal injection site, performing the process actions of:

periodically detecting whether a finger of the user's first or second hand is touching a signal sensing site on the exterior of the handheld mobile computing device; and after each periodic detection event, refraining from injecting said signal into the part of a user's first hand that is touching the signal injection site if a finger of the user's first or second hand is not touching a signal sensing site on the exterior of the handheld mobile computing device.

14. The process of claim 9, wherein the injected signal is an electrical signal exhibiting a prescribed frequency range, and wherein the signal injection site on the exterior of the handheld mobile computing device is not the same as any of the one or more signal sensing sites.

15. The process of claim 9, wherein the injected signal is an ultrasonic signal.

16. The process of claim 15, wherein there is just one signal sensing site on the exterior of the handheld mobile computing device, and the signal injection site and the signal sensing site are the same site.

17. A handheld mobile computing device, comprising:
a signal injection site on the exterior of the handheld mobile computing device comprising,
   a signal injection site touch sensor which detects when a part of a user's first hand is touching the signal injection site, and
   a signal injector which injects a signal into user's first hand for a prescribed period of time if it is detected that said part of a user's first hand is touching the signal injection site;
at least one signal sensing site on the exterior of the handheld mobile computing device each comprising a signal sensor which captures a signal emanating from a finger of the user's first or second hand that is touching a signal sensing site during at least the period of time said signal is injected into the user's first hand, said captured signal being caused by the injected signal traveling through the user's body to said finger; and
a computer program comprising program modules executable by the handheld mobile computing device, wherein the computing device is directed by the program modules of the computer program to,
   analyze the captured signal emanating from said finger of the user's first or second hand that is touching a signal sensing site, and
   determine whether the captured signal matches, to a prescribed degree, a pre-established signal model that is indicative of a signal expected to be captured from a finger of the user's first or second hand that is touching a signal sensing site during at least the period of time said signal is injected into the user's first hand.

18. The handheld mobile computing device of claim 17, wherein the signal injection site is on the back of the handheld mobile computing device, and the part of a user's first hand touching the signal injection site is the user's palm.

19. The handheld mobile computing device of claim 17, wherein the signal injection site is a power button of the handheld mobile computing device, and the part of a user's first hand touching the signal injection site is one of the user's fingers.

20. The handheld mobile computing device of claim 17, wherein a signal sensing site is a touchscreen of the handheld mobile computing device.

* * * * *